United States Patent
Jin

(10) Patent No.: US 12,554,911 B2
(45) Date of Patent: Feb. 17, 2026

(54) OPC MODEL SIMULATION METHOD

(71) Applicant: Shanghai Huahong Grace Semiconductor Manufacturing Corporation, Shanghai (CN)

(72) Inventor: Xiaoliang Jin, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 801 days.

(21) Appl. No.: 17/865,533

(22) Filed: Jul. 15, 2022

(65) Prior Publication Data

US 2023/0025777 A1    Jan. 26, 2023

(30) Foreign Application Priority Data

Jul. 20, 2021    (CN) .......................... 202110817797.4

(51) Int. Cl.
G06F 30/20    (2020.01)
G06F 30/3308    (2020.01)
G06F 111/02    (2020.01)

(52) U.S. Cl.
CPC ...... *G06F 30/3308* (2020.01); *G06F 2111/02* (2020.01)

(58) Field of Classification Search
CPC .. G06F 30/3308; G06F 2111/02; G06F 30/20; G06F 2111/06; G06F 2111/10; G03F 1/36; G03F 7/705; G03F 7/70441
See application file for complete search history.

(56) References Cited

U.S. PATENT DOCUMENTS

| | | | | |
|---|---|---|---|---|
| 7,458,059 | B2* | 11/2008 | Stirniman | G03F 7/705 716/53 |
| 10,310,371 | B2* | 6/2019 | Ye | G03F 7/705 |
| 2007/0100591 | A1* | 5/2007 | Harazaki | G03F 1/36 703/2 |
| 2019/0146455 | A1* | 5/2019 | Beylkin | G06F 30/392 700/97 |

* cited by examiner

*Primary Examiner* — Rehana Perveen
*Assistant Examiner* — John David Hagler
(74) *Attorney, Agent, or Firm* — Harris Beach Murtha Cullina PLLC

(57) ABSTRACT

The present application discloses an OPC model simulation method. The method includes the following steps: step 1, establishing a precision judgment function which is formed by multiplying each square of the difference between a simulation point of an OPC model and an actual point on a wafer, by weight, and then superposing all the squares; step 2, performing random data sampling, comprising forming distributed computing nodes; randomly distributing data to each computing node, and meanwhile distributing a current state value of fitting parameter space composed of all fitting parameters to each computing node; computing a local precision judgment function of each computing node; step 3, performing parallel computing to obtain the gradient of each local precision judgment function, and computing a first derivative and a first order approximate value of the gradient of each local precision judgment function; step 4, performing gradient composition and iteration.

13 Claims, 2 Drawing Sheets

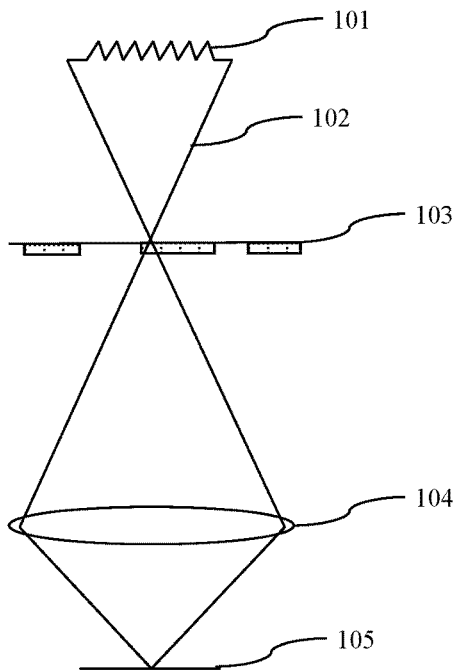

Fig. 1 (Prior Art)

Step 1, establish a precision judgment function which is formed by multiplying each square of the difference between a simulation point of an OPC model corresponding to each data point of the dataset and an actual point on a wafer, by weight, and then superposing all the squares Step 2, perform random data sampling, including: randomly distribute data to each computing node, and meanwhile distribute a current state value of fitting parameter space composed of all fitting parameters to each computing node; compute a local precision judgment function of each computing node Step 3, perform parallel computing to obtain the gradient of each local precision judgment function through the distributed computing nodes, and compute a first derivative and a first order approximate value of the gradient of each local precision judgment function.

Step 4, perform gradient composition and iteration

Fig. 2

OPC MODEL SIMULATION METHOD

CROSS-REFERENCE TO RELATED APPLICATIONS

This application claims priority to co-pending Chinese patent application No. CN 202110817797.4, filed on Jul. 20, 2021, and entitled "OPC MODEL SIMULATION METHOD", the disclosure of which is incorporated herein by reference in entirety.

BACKGROUND

Technical Field

The present application relates to a manufacture method of semiconductor integrated circuits, in particular relates to an optical proximity correction (OPC) model simulation method.

Description of Related Art

In photolithography technology, a final graphics on a wafer is determined by the intensity distribution of illumination and the chemical reaction of a photoresist. The phenomenon of interference diffraction in an optical system is the primary cause of imaging distortion, and is also a key point of OPC model simulation.

FIG. 1 is a structure diagram of an optical system in the existing photolithography technology; light 102 emitted by an illumination 101 penetrates through a mask 103 having a graphical structure, passes an exposure system 104 and then is focused on a wafer 105. The exposure system 104 includes a lens.

Maxwell equations can be used in the whole optical system to describe the distribution of electromagnetic field in space. If a three-dimensional structure of the mask is ignored and simplified into a two-dimensional plane, a Hopkins integral equation can be obtained, and finally a convolution formula for light intensity distribution can be obtained.

$$I(x, y) = \sum_{i=1}^{\infty} \lambda_i \left| \int \int M(x_1, y_1) K_i(x - x_1, y - y_1) dx_1 dy_1 \right|^2 \quad (1)$$

In the formula (1), x and y indicate a two-dimensional coordinate on the wafer, and I indicates light intensity on the wafer.

x1 and y1 indicate a two-dimensional plane coordinate on the mask, M( ) indicates a mask function, K( ) indicates an optical convolution kernel determined by the optical system in the photolithography technology, multiple K( ) exist and are separately indicated with $k_i$( ), i indicates a number of the optical convolution kernel, $\lambda$ indicates a factor of the optical convolution kernel, and a factor corresponding to each $K_i$ ( ) is expressed by $\lambda_i$. $\lambda_i$ is a fitting parameter, namely $\lambda_i$ in an OPC model is an undetermined value and is required to be obtained through fitting, Main computing for OPC modeling and fitting focuses on searching for proper undetermined coefficients $\lambda_i$.

With the improvement of the complexity of the photolithography technology and the fitting precision requirements, the number of the fitting parameters $\lambda_i$ can be increased, the data volume can increased greatly, and adopting a computer to perform fitting in the prior art is low in efficiency and cannot accomplish fitting at last.

BRIEF SUMMARY

A technical problem to be solved by the present application is to provide an OPC model simulation method, which can improve the fitting efficiency in the condition that the complexity of the photolithography technology and the fitting precision are improved.

According to some embodiments in this application, the OPC model simulation method includes the following steps:

Step 1, establishing a precision judgment function.

The precision judgment function includes a plurality of data points, all of which form a dataset.

The precision judgment function is formed by multiplying each square of the difference between a simulation point of the OPC model corresponding to each data point in the dataset and an actual point on the wafer corresponding to each data point in the dataset, by weight, and then superposing all the squares.

The simulation point is obtained by nonlinear fitting functions corresponding to multiple optical convolution kernels of an optical system in the photolithography technology, and coefficients of the optical convolution kernels are fitting parameters.

Step 2, performing random data sampling, including:

Setting a computing cluster composed of a plurality of computers, with each computer corresponding to more than one computing node, where the computing nodes form distributed computing nodes and can realize parallel computing.

Performing data distribution on the dataset in a random distribution mode, where each computing node randomly draws part of data points from the dataset for fitting.

Distributing a current state value of fitting parameter space composed of all the fitting parameters to each computing node while distributing data.

Computing a local precision judgment function corresponding to each computing node, the local precision judgment function being formed by multiplying each square of the difference between a simulation point corresponding to each data point in a data subset composed of part of data points randomly drawn from the computing node and an actual point on the wafer corresponding to each data point in a data subset composed of part of data points randomly drawn from the computing node, by weight, and then superposing all the squares.

The precision judgment function is the sum of all the local precision judgment functions.

Step 3, performing parallel computing to obtain the gradient of each local precision judgment function through the distributed computing nodes, the gradient of the local precision judgment function being a superimposed value of partial derivative values to all the fitting parameters by the local precision judgment function.

Computing a first derivative and a first order approximate value of the gradient of each local precision judgment function, the first derivative of the gradient of the local precision judgment function being a superimposed value of partial derivative values to all the fitting parameters by the local precision judgment function; the first order approximate value of the gradient of the local precision judgment function is a first order expansion value of the gradient of the local precision judgment function obtained according to the first derivative of the gradient of the local precision judgment function.

Step 4, performing gradient composition and iteration.

The gradient composition includes performing computing according to the gradient of the precision judgment function of the current state and the first order approximate value of the gradient of the local precision judgment function, to obtain the gradient of a precision judgment function after composition.

Optimizing the fitting parameter space, including the following steps: performing computing according to the current state value of the fitting parameter space and the gradient of the precision judgment function after composition, to obtain an optimized value of the fitting parameter space.

Taking the optimized value of the fitting parameter space as a current state value of the fitting parameter space, and taking the gradient of the precision judgment function after composition as the gradient of the precision judgment function of current state, then repeating the step 2, step 3 and step 4 till the value of the precision judgment function reaches the fitting precision.

In some cases, the number of the data points in the dataset is more than thousands.

In some cases, the actual point is the actual distribution value of the light intensity of the optical system of the photolithography technology on the wafer.

In some cases, the simulation point is a simulation value in the OPC model to the actual point.

In some cases, the optical system includes a mask.

In some cases, the simulation point of the OPC model adopts all fitting parameters of the fitting parameter space corresponding to values of the precision judgment function when the values reach the fitting precision, to set and accomplish simulation of the OPC model.

In some cases, the mask is set according to the OPC model after accomplishment of simulation.

In some cases, in step 4, the computing of gradient composition is to add the gradient of the precision judgment function of the current state and the first order approximate value of the gradient of the local precision judgment function which is multiplied by a first coefficient together, to obtain the gradient of the precision judgment function after composition.

In some cases, in step 4, the computing of the optimization to the fitting parameter space is to subtract the gradient of the precision judgment function, after composition, which is multiplied by a second coefficient from the current state value of the fitting parameter space, to obtain the optimized value of the fitting parameter space.

In some cases, in the step 2, the number of the computing nodes in the computing cluster is expanded in a linear expansion mode.

In some cases, when step 2 is performed for the first time, the current state value of the fitting parameter space distributed to each computing node is an initial state value of the fitting parameter space.

In some cases, in step 4, all the computing nodes are asynchronously updated.

A further improvement is that the number of the data points in the dataset is more than 5 thousand.

The present application performs parallel computing to obtain the gradient of a nonlinear function through the distributed computing nodes, namely to obtain the gradient of each local precision judgment function through the distributed computing nodes, as the gradient computing of the nonlinear function is most time-consuming, the present application performing parallel computing through distributed computing nodes can greatly improve the fitting efficiency, thereby facilitating fitting in the condition that the complexity and the fitting precision of the photolithography technology are improved.

The present application obtains data of each computing node during fitting in a distribution mode of random sampling, which can avoid local overfitting, and finally can also improve the fitting efficiency.

The present application composites the result of each computing node through the first order approximate value of the gradient of the local precision judgment function, can not only quicken the convergence rate, but also guarantee the fitting precision.

In addition, each computing node of the present application does not have dependence and global lock, and can achieve proper linear expansion, for example, when the fitting efficiency and the fitting precision are required to be further improved, the number of the computing nodes can be increased.

BRIEF DESCRIPTION

The present application is further described in detail in conjunction with accompanying drawings and detailed description below:

FIG. 1 is a structure diagram of an optical system in the existing photolithography technology;

FIG. 2 is a flow chart of an OPC model simulation method of an embodiment of the present application;

DETAILED DESCRIPTION

Figure 3:
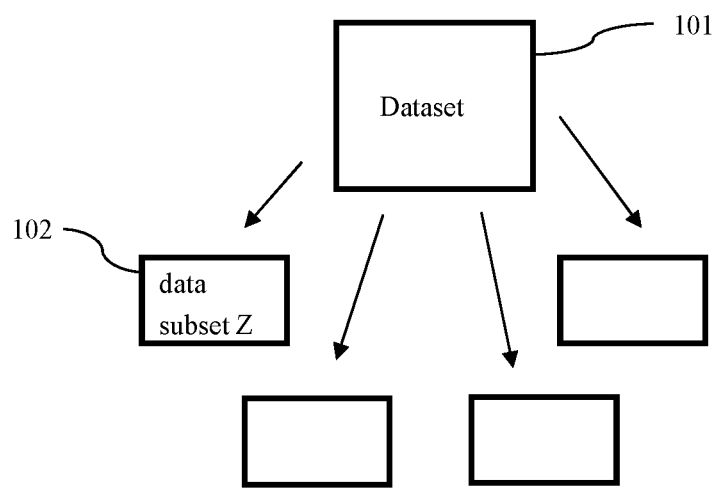
FIG. 3 is a schematic diagram of data distribution in step 2 in the OPC model simulation method of an embodiment of the present application.

FIG. 2 is the flow chart of the OPC model simulation method of an embodiment of the present application; the OPC model simulation method of the embodiment of the present application includes the following steps that:

Step 1, establish a precision judgment function.

The precision judgment function includes a plurality of data points, all of which form a dataset.

In the embodiment of the present application, the number of the data points in the dataset is more than thousands; preferably, the number of the data points in the dataset is more than 5 thousand. In order to achieve the precision of the OPC model, the result of model fitting is required to be close to the actual result of the wafer to the greatest extent, the more the number of the data points, the better the precision of the OPC model, however, the amount of computation can also be increased. The following description is given by taking the number of the data points in the dataset as 5000 as an example.

The precision judgment function is formed by multiplying each square of the difference between a simulation point of the OPC model corresponding to each data point in the dataset and an actual point on the wafer corresponding to each data point in the dataset, by weight, and then superposing all the squares.

The simulation point is obtained by nonlinear fitting functions corresponding to multiple optical convolution kernels of an optical system in the photolithography technology, and coefficients of the optical convolution kernels are fitting parameters.

The actual point is the actual distribution value of the light intensity of the optical system of the photolithography technology on the wafer. The optical system includes a mask.

The simulation point is the simulation value in the OPC model to the actual point.

In order to facilitate detailed description in combination with a formula, now the following definition is made: the actual point is defined as $f_i$, the simulation point is defined as $s_i$, as the significance for different data is different, weight is defined as $w_i$, and i indicates the number of a data point.

For each simulation point, a computing formula is as follows:

$$s_i = F(\lambda_1, \lambda_2, \ldots \lambda_M) \qquad (2);$$

where F corresponds to nonlinear fitting functions corresponding to M optical convolution kernels; $\lambda$ indicates the fitting parameters; the fitting parameters corresponding to different optical convolution kernels are separately indicated by with subscripts $\lambda$ namely $\lambda_j$, j indicates the number of an optical convolution kernel, $\lambda_j$ corresponding to M optical convolution kernels are separately $\lambda_1, \lambda_2, \ldots \lambda_M$.

The formula of the precision judgment function is as follows:

$$C(\lambda_1, \lambda_2, \ldots \lambda_M) = \sum_{i=1}^{5000} (s_i - f_i)^2 w_i; \qquad (3)$$

where the function C indicates the precision judgment function which is a nonlinear function, and in order to achieve an optimum fitting result, the minimum value of C is required to be obtained through an iteration method.

Step 2, perform random data sampling, including:
set a computing cluster composed of a plurality of computers, with each computer corresponding to more than one computing node, where the computing nodes form distributed computing nodes and can realize parallel computing. With the improvement of the complexity of the photolithography technology and the fitting precision requirements, the improvement of the complexity of the function C, and the increase of the number of the fitting parameters $\lambda$, the data volume is also greatly increased, and cannot be accomplished with only one computer. Thus, embodiments of the present application adopt a computer cluster, and perform iteration through a plurality of computers.

Perform data distribution on the dataset in a random distribution mode, where each computing node randomly draws part of data points from the dataset for fitting.

Distribute a current state value Z, Z including ($\lambda_1$, $\lambda_2 \ldots \lambda_m$) of fitting parameter space composed of all the fitting parameters to each computing node while distributing data. When step 2 is performed for the first time, the current state value Z of the fitting parameter space is the initial state value of the fitting parameter space.

FIG. 3 is a schematic diagram of data distribution in step 2 in the OPC model simulation method of an embodiment of the present application; data of a dataset 101 can be randomly distributed to each computing node 102, and data distributed in each computing node 102 includes the data subset and the current state value Z of the fitting parameter space. In the embodiment of the present application, the data of the computing nodes in the computing cluster is expanded in a linear expansion mode; and Compute a local precision judgment function corresponding to each computing node, the local precision judgment function being formed by multiplying each square of the difference between a simulation point corresponding to each data point in a data subset composed of part of data points randomly drawn from the computing node and an actual point on the wafer corresponding to each data point in a data subset composed of part of data points randomly drawn from the computing node, by weight, and then superposing all the squares.

The precision judgment function is the sum of all the local precision judgment functions.

The formula of the local precision judgment function is as follows:

$$C_k(\lambda_1, \lambda_2, \ldots \lambda_M) = \sum_{k_1}^{k_m} (s_i - f_i)^2 w_i; \qquad (4)$$

where a function $C_k$ indicates the local precision judgment function, k indicates the $k^{th}$ computing node, and $k_1$ to $k_m$ indicates the numbers of m data points included in the data subset of the $k^{th}$ computing node.

Step 3, perform parallel computing to obtain the gradient of each local precision judgment function through the distributed computing nodes, the gradient of the local precision judgment function being a superimposed value of partial derivative values to all the fitting parameters by the local precision judgment function.

The formula of the gradient of the local precision judgment function is as follows:

$$\Delta_k = \sum_{j=1}^{M} \frac{\partial C_k}{\partial \lambda_j}; \qquad (5)$$

where $\Delta_k$ indicates the gradient of the local precision judgment function, as $C_k$ is a nonlinear function, and the computing of the optimum gradient is most time-consuming, perform parallel computing with a plurality of computing nodes can greatly improve the efficiency.

Compute a first derivative and a first order approximate value of the gradient of each local precision judgment function, the first derivative of the gradient of the local precision judgment function being a superimposed value of partial derivative values to all the fitting parameters by the local precision judgment function; the first order approximate value of the gradient of the local precision judgment function is a first order expansion value of the gradient of the local precision judgment function obtained according to the first derivative of the gradient of the local precision judgment function.

The formula of the first derivative of the gradient of the local precision judgment function is as follows:

$$\nabla_k = \sum \frac{\partial \Delta_k}{\partial \lambda_j}; \qquad (6)$$

$\nabla_k$ indicates the first derivative of the gradient of the local precision judgment function.

The first order approximate value of the gradient of the local precision judgment function is as follows:

$$\nabla_k(\Delta_k - \Delta_{k0}) \qquad (7);$$

Formula (7) represents the first order approximation in the expansion formed by $\Delta_k$ at $\Delta_{k0}$, and $\Delta_{k0}$ is a constant.

The first order approximate value of the gradient of each local precision judgment function is used for the final gradient composition in the following steps.

Step 4, perform gradient composition and iteration.

As the gradient of the local precision judgment functions is obtained according to part of data, the gradient is required to be composited at a data control point. As all the computing nodes perform parallel computing and are asynchronously updated, the parameter state of the computing nodes may have been updated by other computing nodes when computing returns.

The first order approximate value of the gradients optimized according to parameters of the current state and computing nodes can incorporate the gradient optimized by the computing node into the current state.

The gradient composition includes performing computing according to the gradient of the precision judgment function of the current state and the first order approximate value of the gradient of the local precision judgment function, to obtain the gradient of a precision judgment function after composition. In the embodiment of the present application, the computing of the gradient composition is as follows: add together the gradient of the precision judgment function of the current state and the first order approximate value of the gradient of the local precision judgment functions formed after being multiplied by the first factor, to obtain the gradient of the precision judgment function after composition.

The formula of gradient composition is as follows:

$$\Delta_c' = \Delta_c + \mu \nabla_k (\Delta_k - \Delta_{k0}) \quad (8);$$

in formula (8), $\Delta_c$ indicates the gradient of the precision judgment function of the current state, $\Delta_c'$ indicates the gradient of the precision judgment function after composition, and $\mu$ indicates the first coefficient.

Figure 4:
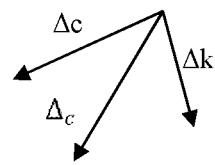
FIG. 4 is a schematic diagram of gradient composition in step 4 in the OPC model simulation method of an embodiment of the present application.

FIG. 4 is a schematic diagram of gradient composition in step 4 in the OPC model simulation method of an embodiment of the present application, it can be seen that $\Delta_c'$ is $\Delta_c$ and $\mu \nabla_k (\Delta_k - \Delta_{k0})$ vector addition.

Optimize the fitting parameter space, including the following steps: perform computing according to the current state value of the fitting parameter space and the gradient of the precision judgment function after composition, to obtain an optimized value of the fitting parameter space. In the embodiment of the present application, the computing of the optimization to the fitting parameter space is to subtract the gradient of the precision judgment function, after composition, which is multiplied by the second coefficient from the current state value of the fitting parameter space, to obtain the optimized value of the fitting parameter space.

The computing formula of the optimization to the fitting parameter space is as follows:

$$z' = z - \rho \Delta_c \quad (9);$$

in formula (9), z indicates the current state value of the fitting parameter space, z' indicates the optimized value of the fitting parameter space, and $\rho$ indicates the second coefficient. After optimization adopting the formula (8) is accomplished, $\Delta_c'$ will serve as the gradient of the current state again, at the moment, $\Delta_c$ is served as the gradient of the precision judgment function of the current state, and $\Delta_c$ in the formula (9) indicates the gradient of the precision judgment function of the current state after updating.

The optimized value of the fitting parameter space is taken as the current state value of the fitting parameter space, the gradient of the precision judgment function after composition is taken as the gradient of the precision judgment function of the current state, then step 2, step 3 and step 4 are repeated till the value of the precision judgment function reaches the fitting precision, and the number of repeating is multiple, namely the optimized value of the precision judgment function is obtained finally after multiple iterations.

After iterations are accomplished, the values of the precision judgment functions adopted by the simulation points of the OPC model reach settings of all the fitting parameters of the corresponding fitting parameter space during fitting precision, simulation of the OPC model is accomplished; the OPC model formed by simulation is provided with the mask.

The embodiment of the present application adopts the distributed computing nodes to perform parallel computing to obtain the gradient of the nonlinear function, namely the gradient of each local precision judgment function, as the gradient computing of the nonlinear function is most time-consuming, the embedment of the present application performing parallel computing through distributed computing nodes can greatly improve the fitting efficiency, thereby facilitating fitting in the condition that the complexity and the fitting precision of the photolithography technology are improved.

The embodiment of the present application obtains data of each computing node during fitting in a distribution mode of random sampling, which can avoid local overfitting, and finally can also improve the fitting efficiency.

The embodiment of the present application composites the result of each the computing node through the first order approximate value of the gradient of the local precision judgment function, which can not only quicken the convergence rate, but also guarantee the fitting precision.

In addition, each computing node of the embodiment of the present application does not have dependence and global lock, and can achieve proper linear expansion, for example, when the fitting efficiency and the fitting precision are required to be further improved, the number of the computing nodes can be increased.

The present application is described through the embodiments, however, the embodiments do not constitute limitations to the present application. Without departing from the principles of the present application, those skilled in the art can also make many modifications and improvements, which should also be regarded as the protection scope of the present application.

What is claimed is:

1. An OPC model simulation method, comprising the following steps:
   step 1 collecting data of actual points on a wafer:
   collecting of data includes providing a mask with a graphical structure;
   conducting an exposure process whereby light emitted by an illumination of an optical system in a lithography process passes through the mask and an exposure system, and is then focused onto the wafer to achieve a desired exposure; collecting data from each actual point on the wafer;
   providing an OPC model that includes a model that simulates the optical system of the lithography process;
   step 2, establishing a precision judgment function;
   the precision judgment function comprises a plurality of data points, all of which form a dataset;

the precision judgment function is formed by multiplying each square of the difference between a simulation point of the OPC model corresponding to each data point in the dataset and an actual point on the wafer corresponding to each data point in the dataset, by weight, and then superposing all the squares;

the simulation point is obtained by nonlinear fitting functions corresponding to multiple optical convolution kernels of an optical system in the photolithography technology, and coefficients of the optical convolution kernels are fitting parameters;

step 3, performing random data sampling, comprising:

setting a computing cluster composed of a plurality of computers, with each computer corresponding to more than one computing node, wherein the computing nodes form distributed computing nodes and can realize parallel computing;

performing data distribution on the dataset in a random distribution mode, wherein each computing node randomly draws part of data points from the dataset for fitting;

distributing a current state value of fitting parameter space composed of all the fitting parameters to each computing node while distributing data;

computing a local precision judgment function corresponding to each computing node, the local precision judgment function being formed by multiplying each square of the difference between a simulation point corresponding to each data point in a data subset composed of part of data points randomly drawn from the computing node and an actual point on the wafer corresponding to each data point in a data subset composed of part of data points randomly drawn from the computing node, by weight, and then superposing all the squares;

the precision judgment function is the sum of all the local precision judgment functions;

step 4, performing parallel computing to obtain the gradient of each local precision judgment function through the distributed computing nodes, wherein the gradient of the local precision judgment function is a superimposed value of partial derivative values to all the fitting parameters by the local precision judgment function;

computing a first derivative and a first order approximate value of the gradient of each local precision judgment function, the first derivative of the gradient of the local precision judgment function being a superimposed value of partial derivative values to all the fitting parameters by the local precision judgment function; the first order approximate value of the gradient of the local precision judgment function is a first order expansion value of the gradient of the local precision judgment function obtained according to the first derivative of the gradient of the local precision judgment function;

step 5, performing gradient composition and iteration;

the gradient composition comprises performing computing according to the gradient of the precision judgment function of the current state and the first order approximate value of the gradient of the local precision judgment function, to obtain the gradient of a precision judgment function after composition;

optimizing the fitting parameter space, comprising the following steps: performing computing according to the current state value of the fitting parameter space and the gradient of the precision judgment function after composition, to obtain an optimized value of the fitting parameter space; and taking the optimized value of the fitting parameter space as a current state value of the fitting parameter space, and taking the gradient of the precision judgment function after composition as the gradient of the precision judgment function of current state, then repeating the step 2, step 3 and step 4 till the value of the precision judgment function reaches the fitting precision;

the current state value of the fitting parameter space when the value of the precision judgment function reaches the fitting precision is taken as the value of the fitting parameters of the OPC model, and a layout is subjected to OPC correction based on the OPC model.

2. The OPC model simulation method according to claim 1, wherein the number of the data points in the dataset is more than thousands.

3. The OPC model simulation method according to claim 1, wherein the actual point is the actual distribution value of the light intensity of the optical system of the photolithography technology on the wafer.

4. The OPC model simulation method according to claim 3, wherein the simulation point is a simulation value in the OPC model to the actual point.

5. The OPC model simulation method according to claim 4, wherein the optical system comprises a mask.

6. The OPC model simulation method according to claim 5, wherein the simulation point of the OPC model adopts all fitting parameters of the fitting parameter space corresponding to values of the precision judgment function when the values reach the fitting precision, to set and accomplish simulation of the OPC model.

7. The OPC model simulation method according to claim 6, wherein the mask is set according to the OPC model after accomplishment of simulation.

8. The OPC model simulation method according to claim 1, wherein, in step 4, the computing of gradient composition is to add the gradient of the precision judgment function of the current state and the first order approximate value of the gradient of the local precision judgment function which is multiplied by a first coefficient together, to obtain the gradient of the precision judgment function after composition.

9. The OPC model simulation method according to claim 1, wherein, in step 4, the computing of the optimization to the fitting parameter space is to subtract the gradient of the precision judgment function, after composition, which is multiplied by a second coefficient from the current state value of the fitting parameter space, to obtain the optimized value of the fitting parameter space.

10. The OPC model simulation method according to claim 2, wherein, in step 2, the number of the computing nodes in the computing cluster is expanded in a linear expansion mode.

11. The OPC model simulation method according to claim 1, wherein, when step 2 is performed for the first time, the current state value of the fitting parameter space distributed to each computing node is an initial state value of the fitting parameter space.

12. The OPC model simulation method according to claim 1, wherein, in step 4, all the computing nodes are asynchronously updated.

13. The OPC model simulation method according to claim 2, wherein the number of the data points in the dataset is more than 5 thousand.

* * * * *